Figure 1:
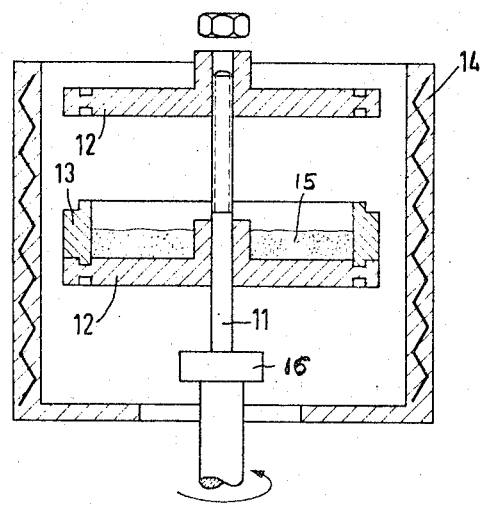

United States Patent Office 3,365,351
Patented Jan. 23, 1968

3,365,351
ROTATIONAL BODY HAVING A MAGNETIC MARGINAL ZONE
Karl Maaz, Nuremberg, and Günter Didschies, Uttenreuth, Germany, assignors to Siemens-Schuckertwerke Aktiengesellschaft, Berlin and Erlangen, Germany, a corporation of Germany
Filed Oct. 22, 1965, Ser. No. 501,800
Claims priority, application Germany, Mar. 3, 1965, S 95,755
1 Claim. (Cl. 161—42)

Our invention relates to rotors and the like bodies which perform rotational motion about their axes when in operation and which are magnetic along their peripheral margin.

Such magnetic discs have been employed for digital angular-step resolvers operating with Hall generators. For exciting the Hall generators to issue respective pulses at given angular steps of rotation, the discs have been made of a magnetic material to which small permanent magnets were attached along the periphery at a mutual spacing sufficient for issuance of a pulse upon a given peripheral travel of more than about 2 mm. For issuance of pulses in steps of less than 2 mm. peripheral travel such discs have been covered with magnetizable rubber, to be magnetized, for example, with alternating north and south polarity. The mechanical strength of such discs, however, does not meet the requirements of rugged operation for purposes of heavy industries.

It is an object of our invention to eliminate the above-mentioned shortcomings.

According to the invention, a rotational body generally of the above-mentioned type is produced as follows. A casting resin is mixed with a comminuted magnetizable filler material of higher specific gravity than the resin. The mixture is vigorously stirred and kept in vacuum until it is free of bubbles. The bubble-free mixture is then filled into a rotational mold corresponding to the shape and dimensions of the rotor body to be produced. In the mold, the mixture is heated and thereby kept fluid, and is simultaneously centrifugated until the filler material is driven to the peripheral marginal zone where it becomes uniformly distributed along the periphery. Thereafter, the mixture is hardened.

Suitable as casting resin for the purposes of the invention is hardenable epoxide resin, for example. A suitable filler material, for example, is barium ferrite $(BaO \cdot 6Fe_2O_3)$, or pulverulent iron. The density of the magnetizable material in the marginal zone of the rotational body can be adjusted as desired by correspondingly dimensioning the rotational speed during centrifugation.

Rotational bodies made in accordance with the invention, particularly when given the shape of a circular disc, are particularly well suitable as pulse transmitters for digital angular-step resolvers. One advantage of such pulse transmitter discs resides in the ease of manufacturing them, as well as in the reduction of the manufacturing cost. Furthermore, the density of the magnetizable filler material in the marginal zone of the disc is independent of the cross-sectional shape or size. For example, flange discs may be placed into the mold in which the mixture is subjected to centrifugation, so that the resulting magnet disc, after hardening, is firmly and rigidly joined with the flange. Another considerable advantage is the fact that the discs balance themselves during the manufacturing process. In addition, the amount of filler material required is not larger than necessary for the desired magnetically active zone. The method of the invention, for example, also affords producing discs with any desired magnetic lobes or profiles.

Figure 2:
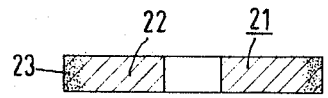

The invention will be further elucidated with reference to an embodiment illustrated by way of example on the accompanying drawing in which:

FIG. 1 shows schematically a device for producing the rotational body of the invention, and
FIG. 2 shows in section a rotational body produced by the device of FIG. 1.

The device for producing the rotational body as shown in FIG. 1 is essentially a centrifugating apparatus composed of a revolvable shaft 11 with a shoulder 16, a number of individual molds of which only one is shown, and a heatable protectable tube 14 in whose cylindrical wall a heater, such as an electric resistance heater is embedded. The individual molds are composed of two circular discs 12 and an intermediate cylindrical ring 14. The protective tube 14 may consist of insulating material or of metal. In the latter case, the embedded heater must be insulated from the metal.

The required quantity of resin-filler mixture 15 is placed into the mold which rests on the shoulder 16 of the shaft 11 during operation. Several such molds may be placed on top of each other, all being fastened to the shaft 11 and pressed against the shoulder 16 by means of a nut placed upon the threaded end of the shaft. A single centrifugating operation permits producing as many rotational bodies as molds are stacked upon each other, it being understood that the top disc 12 of the illustrated mold will constitute the bottom of the next higher mold.

For producing a rotor disc of synthetic plastic with a magnetic marginal zone having a diameter of 80 mm., 10 parts of casting resin are given an admixture of 1 part hardener, for example. Added thereto are 30 parts of barium ferrite. The mixture is intimately stirred and thereafter kept in vacuum until free of bubbles. The bubble-free mixture is then filled into a disc-type mold, such as described above with reference to FIG. 1, the quantity placed into the mold being in accordance with the volume of the rotational body to be produced. The content of the mold is then centrifugated for about 10 minutes at a rotational speed of about 5,000 rotations per minute at a temperature of 80° C. Then the speed is raised to about 30,000 r.p.m. for three minutes and thereafter reduced back to 5,000 r.p.m. The resin is then hardened at the latter speed by permitting it to cool down to normal room temperature. The entire operation requires approximately 30 minutes.

FIG. 2 shows a disc 21 of synthetic plastic produced in accordance with the example just described. Denoted by 22 is the main body of casting resin and by 23 the magnetic marginal zone.

We claim:
1. A rotational structure consisting of a cylindrical body of substantially constant circular cross section formed of hardened casting resin and having a comminuted magnetizable material embedded and uniformly distributed in said casting resin along the peripheral margin of said body.

References Cited
UNITED STATES PATENTS
3,129,269  4/1964  Charvat _____ 264—45

OTHER REFERENCES
Skeist, Epoxy Resins, 1958, p. 5.

ROBERT F. BURNETT, Primary Examiner.
ALEXANDER WYMAN, Examiner.
M. A. LITMAN, Assistant Examiner.